United States Patent
Iijima

(10) Patent No.: US 7,573,510 B2
(45) Date of Patent: Aug. 11, 2009

(54) ELECTRONIC CAMERA APPARATUS WITH MOVING-IMAGE PICKING-UP FUNCTION AND MOVING-IMAGE RECORDING METHOD FOR RECORDING A MOVABLE IMAGE ON A REMOVABLE RECORDING MEDIUM

(75) Inventor: Jun Iijima, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 574 days.

(21) Appl. No.: 11/285,996

(22) Filed: Nov. 21, 2005

(65) Prior Publication Data

US 2006/0109754 A1 May 25, 2006

(30) Foreign Application Priority Data

Nov. 24, 2004 (JP) ............................. 2004-338250

(51) Int. Cl.
H04N 5/76 (2006.01)
(52) U.S. Cl. ................................. 348/231.9; 348/231.1
(58) Field of Classification Search ............ 348/231.99, 348/231.1, 231.7–231.9
See application file for complete search history.

(56) References Cited

U.S. PATENT DOCUMENTS 5,153,730 A * 10/1992 Nagasaki et al. ......... 348/231.6

6,449,426 B1 * 9/2002 Suga et al. ................. 386/117

FOREIGN PATENT DOCUMENTS

| JP | 1-128126 | | 5/1989 |
|---|---|---|---|
| JP | 2001-128105 | A | 5/2001 |
| JP | 2001-352510 | A | 12/2001 |
| JP | 2002-335486 | A | 11/2002 |
| JP | 2004-007216 | A | 1/2004 |
| JP | 2004-080427 | A | 3/2004 |

* cited by examiner

*Primary Examiner*—Timothy J Henn
(74) *Attorney, Agent, or Firm*—Frishauf, Holtz, Goodman & Chick, P.C.

(57) ABSTRACT

Before a moving image is picked up, a data write speed of set recording media 20 is measured or acquired (steps S2-S5, S6). The speed performance of the recording media (represented by "high", "medium" and "low") is determined based on the measured or acquired data write speed (step S7). In the moving-image pickup, when the determined write speed performances are low, medium and high, respectively, control passes to a buffer data lump recording mode, a ring buffer recording mode and a stream recording mode, respectively, and then the moving-image data is recorded on recording media 20 in different moving-image recording methods (steps S11, S12 and S13), respectively. Thus, the settable upper limit of recording quality need not be set to that of recording media having low write speed performance.

8 Claims, 6 Drawing Sheets

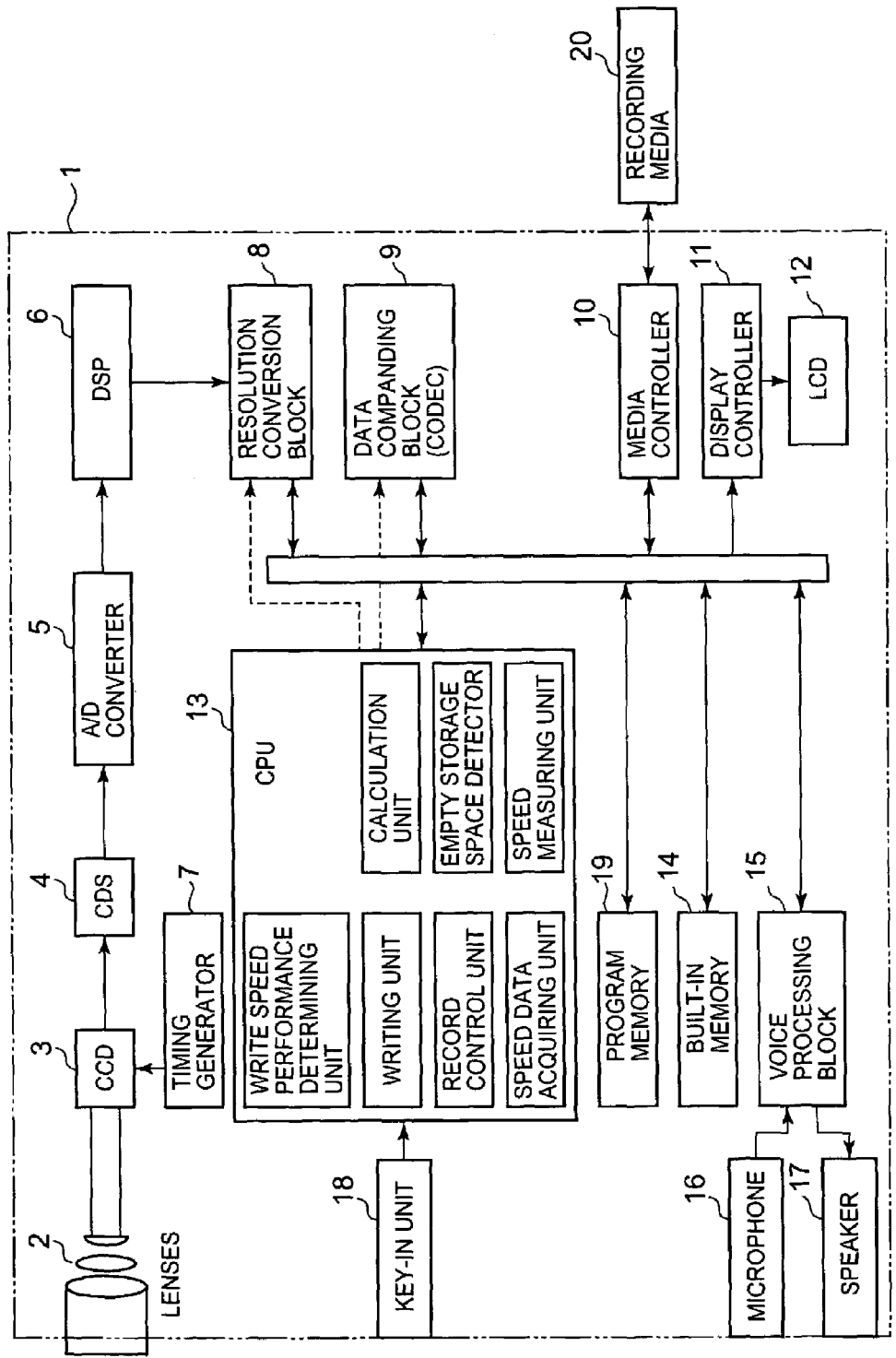

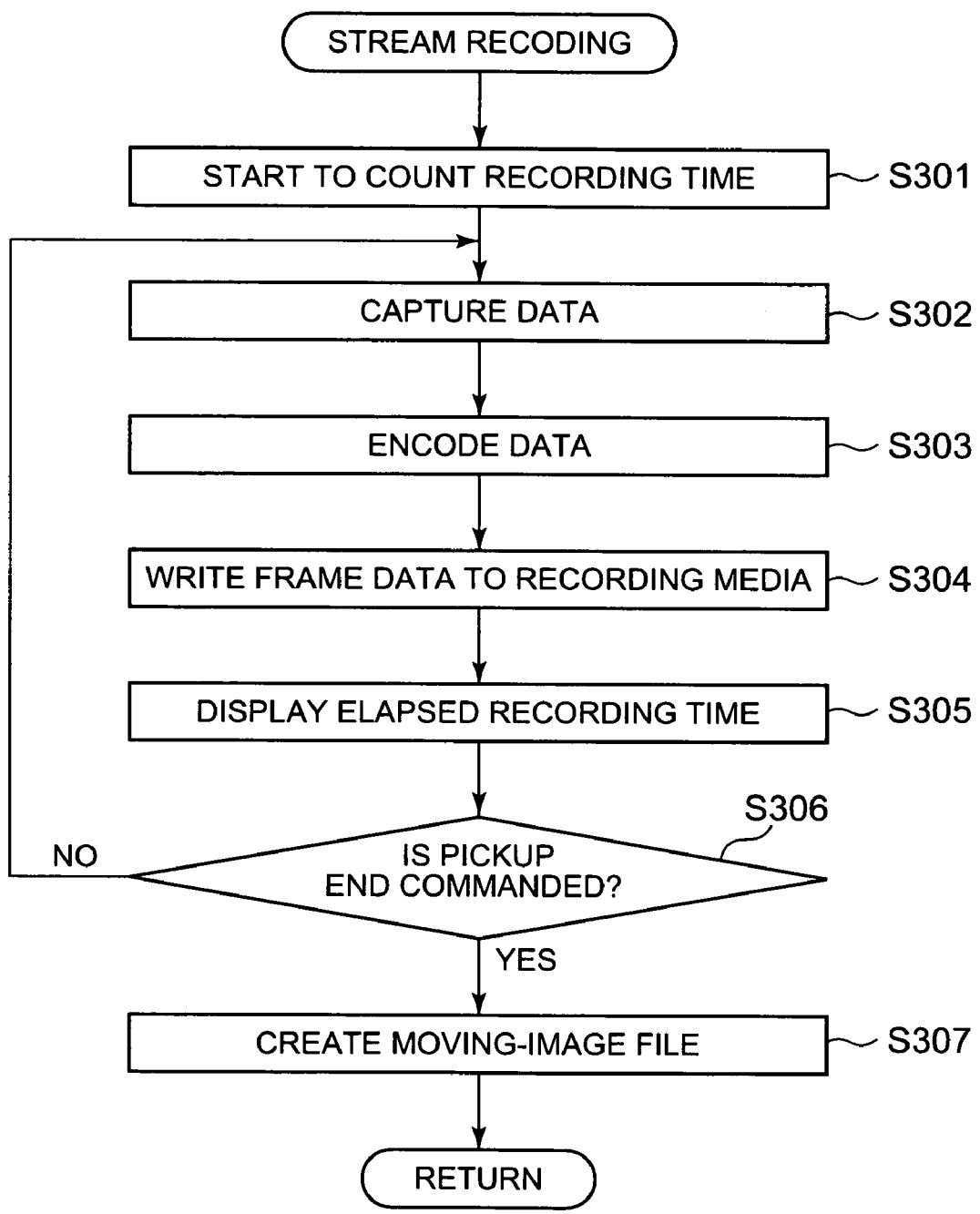

ELECTRONIC CAMERA APPARATUS WITH MOVING-IMAGE PICKING-UP FUNCTION AND MOVING-IMAGE RECORDING METHOD FOR RECORDING A MOVABLE IMAGE ON A REMOVABLE RECORDING MEDIUM

CROSS-REFERENCE TO RELATED APPLICATION

This application is based upon and claims the benefit of priority from the prior Japanese Patent Application No. 2004-338250, filed on Nov. 24, 2004, the entire contents of which are incorporated herein by reference.

BACKGROUND OF THE INVENTION

1. Field of the Invention

The present invention relates to electronic camera apparatus with a moving-image pickup function and moving-image recording methods.

2. Description of the Related Art

In the past, typical digital cameras with a moving-image pickup function have recording media removably set on bodies thereof. In such digital camera, main three methods of recording a moving image on a recording medium are used. One of these methods comprises temporarily and sequentially storing data on moving frame images picked up at predetermined frame rates on an internal memory to/from which the image data can be read/written at high speeds and when the image pickup is terminated, storing all such data collectively on a separate recording medium. Another method comprises writing flame data in a buffer area for a plurality of frame images secured in the internal memory, simultaneously reading out the previous stored frame data, storing it on the recording medium, erasing the frame data from the internal memory, and then repeating these operations. In this case, the internal memory is used as a ring buffer. The last method comprises sequentially recording frame data on a recording medium, which method is generally referred to as streaming.

These three methods have merits and demerits. In terms of successively image-pickable-up or -recordable time, the last-mentioned method is most advantageous. In terms of data write speed performance required from recording media, or a data quantity writable per unit time to be required, the first-mentioned method is most advantageous.

Published unexamined Japanese Patent Application 2001-352510 discloses a digital camera in which still and moving image data having smaller and larger data quantities per unit time are recorded on two different removable recording mediums having known lower and higher write speeds, respectively, in order to prevent moving-image frame data and/or associated sounds from becoming missing and/or disappearing during recording.

Even when the method of recording the moving-image data is fixed in the digital camera with the moving-image pickup function as described above, the user can select a recording quality of the moving picture (for example, fine, normal or economical), thereby automatically setting recording parameters (indicating a data compression rate, an image size and a frame rate) determined for that recording quality in the image pickup.

However, the write speed performance of recording media that will be used in the digital camera varies depending on the type (or standard) of the media. In addition, even when recording media have the same standard, they actually vary from maker to maker. Thus, the upper limit of the recording quality settable in the moving-picture pickup need be set to the general write speed performance of settable recording media of a type to be used, or to a lower recording quality in which the moving image data is recordable sufficiently. Thus, when a recording medium having higher write speed performance than the general one beforehand presumed is used, its write speed performance cannot be sufficiently brought into full play.

SUMMARY OF THE INVENTION

In one preferable aspect, the present invention provides an electronic camera apparatus with a moving-image pickup function that records a moving image on a removable recording medium. A speed performance determining unit determines data write speed performance of the recording medium. A writing unit writes the moving-image data on the recording medium in one of a plurality of prepared moving-image recording methods determined in correspondence to the write speed performance of the recording medium determined by the speed performance determining unit.

In another preferable aspect, the present invention also provides a moving image recording method to be used in an electronic camera apparatus with a moving-image pickup function that records a moving image on a removable recording medium. In the method, data write speed performance of the recording medium is determined. The moving-image data is then written on the recording medium in one of a plurality of prepared moving-image recording methods determined in correspondence to the write speed performance of the recording medium determined in the speed performance determining step.

In still another preferable aspect, the present invention also provides a computer program readable by a computer included in an electronic camera apparatus with a moving-image pickup function that records a moving image on a removable recording medium. The program is configured to cause the computer to operate as a speed performance determining unit for determining data write speed performance of the recording medium, and a writing unit for writing the moving-image data on the recording medium in one of a plurality of prepared moving-image recording methods determined in correspondence to the write speed performance of the recording medium determined by the speed performance determining unit.

According to the present invention, moving-image pickup is achieved which fully exploits the write speed performance of a recording medium to be used.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram of a digital camera according to the present invention;

FIG. 6 is a flowchart of a third subroutine of the FIG. 3 flowchart.

DETAILED DESCRIPTION OF THE INVENTION

Figure 2A:
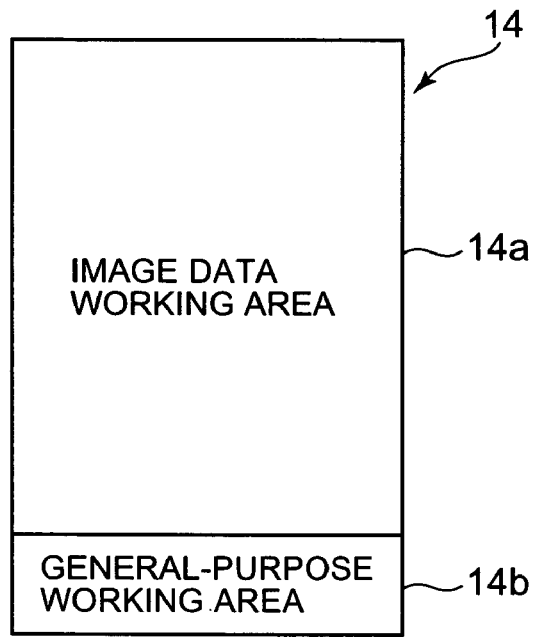
FIGS. 2A and 2B schematically illustrate memory spaces of a built-in memory in the non-pickup and pickup, respectively, of a moving image.

One embodiment of a digital camera according to the present invention will be described next with reference to the accompanying drawings. Referring to FIG. 1, there is shown the camera that has a moving-picture pickup function. The camera has on its body 1 various removable recording media 20 on which files of still-moving image data produced by image pickup can be recorded.

Camera body 1 comprises optical system 2 of lenses and CCD 3 that comprises color filters, for example of Bayer arrangement, attached thereto as an image pickup unit that forms an optical image of an object on a photodetection face of CCD 3 via optical system 2. CCD 3 is driven by a drive signal received from timing generator 7 and converts the optical image of the object to an electric pickup signal, which is then outputted as an image pickup signal. This signal is then subjected to correlation double sampling and gain adjustment in CDS circuit 4. A resulting signal is converted by A/D converter 5 to a digital signal. DSP 6 performs a pedestal clamping operation on the digital signal, or Bayer data, and then converts resulting data to brightness data Y and two different color difference data U,V in a brightness/color difference matrix circuit thereof DSP 6 also performs an image quality improving process including auto white balancing, contour emphasis and pixel interpolation on the brightness data Y and two different color difference data U and 0V, thereby outputting YUV data including these data.

The YUV data outputted from DSP 6 is converted to data for a frame size in resolution conversion block 8 and then stored in image data working area 14a (see FIG. 2) secured in built-in memory 14 (for example, of a SDRAM). The one-frame YUV data stored in memory 14 is then sent to display controller 11 where it is converted to a video signal and displayed as a through image on LCD 12. LCD 12 functions as a display unit of the present invention by displaying remaining recording time 102 and elapsed recording time 103, which will be described later in more detail as required in the moving-image pickup.

The YUV data sequentially stored in memory 14 during the moving-image pickup are then sequentially delivered to data compression/expansion block 9 where the respective data are compressed by a codic of a predetermined moving-image recording system (for example, of Motion-JPEG/MPEG) and then recorded finally as a moving-image file on recording media 20 via media controller 10. The frame rate at which a moving-image is picked up is determined by timing signals generated by timing generator 7. The compression rate of data to be coded is determined depending on a selected quantization value on a quantization table provided in data compression/expansion block 9.

The one-frame YUV data stored in memory 14 during still-image pickup is compressed in a JPEG system by data compression/expansion block 9, coded and arranged in the form of a file in memory 14 and then recorded as still-image data, or its file, on recording media 20 via media controller 10. Data compression/expansion block 9 expands still or moving image data read out from recording media 20 when a still or moving image is reproduced, and then loads the data as still or moving image frame data in image data working area 14a of memory 14.

Voice processing block 15 converts a voice inputted to microphone 16 built in camera body 1 in the pickup of a moving-image with sounds to a digital signal, which is then compressed and delivered as audio data to memory 14. The audio data is then recorded along with a resulting moving-image file on recording media 20. When a moving image with voices is reproduced, voice processing block 15 decodes audio data received from memory 14 and then converts it to an analog voice signal. This voice signal will be then let off as a sound from speaker 17 built in camera body 1.

Key-in block 18 comprises a power source key, a mode switch key that switches between a recording mode and a play mode, a menu key and a shutter key. Key-in block 18 outputs to CPU 13 a keyed-in signal in accordance with a user's operation. The shutter key also functions as a recording start/end button in the moving-picture pickup.

CPU 13 controls operation of the above respective blocks in accordance with programs, which are stored along with data to be used for control of the respective blocks in program memory 19. CPU 13 functions as a write speed performance determining unit, a writing unit, an empty storage-space detecting unit, a recording control unit, a speed measuring unit, an operation unit, and a speed data acquiring unit of the present invention when operating in accordance with the programs and the key-in signals from the key-in block 18.

Program memory 19 comprises a rewritable non-volatile memory such as an EEPROM or a flash memory, and in addition to the above-mentioned programs and data, stores various data on systems and functions set by the user including, for example, recording parameters such as image sizes, frame rates and compression rates for determining the quality of a moving image that will be recorded in the moving-image pickup, as required.

Figure 2B:
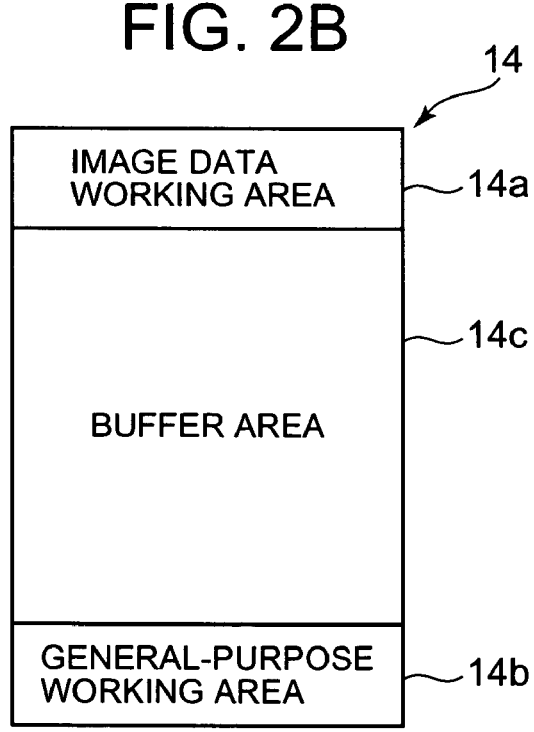

As shown in FIG. 2A, memory 14 comprises in addition to image data working area 14a, a general-purpose working area 14b used as a working memory for CPU 13 and a buffer area 14c to be provided as required in the moving-image pickup, as shown in FIG. 2B, thereby functioning as a buffer memory of the present invention.

Figure 3:
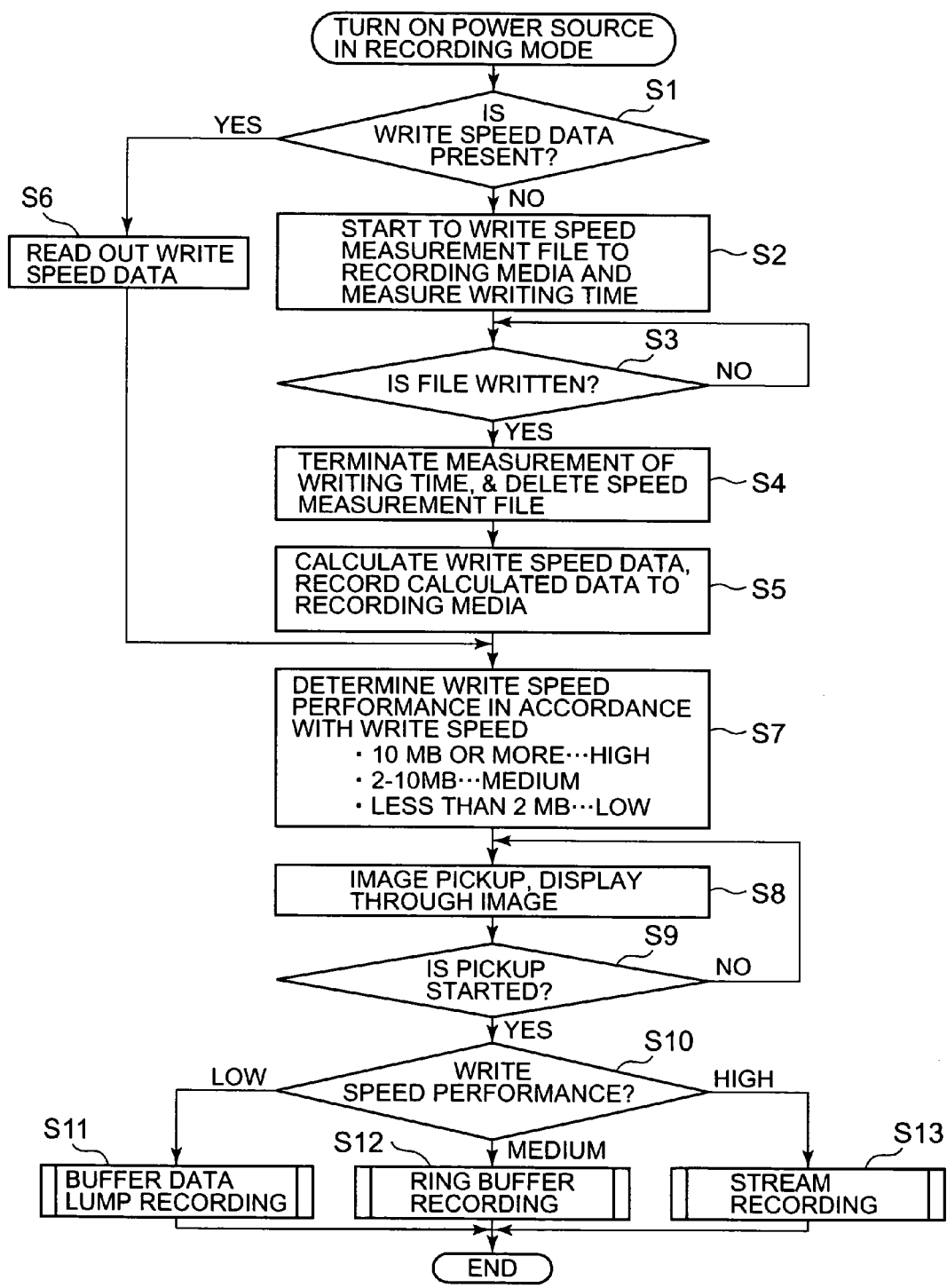
FIG. 3 is a flowchart of a moving-image pickup process to be performed in the camera.

Operation of the camera of this invention will be next described with respect to FIG. 3, which is a flowchart of a moving-image pickup process to be performed by CPU 13 when the user turns on the power source in a recording mode.

When the power source is turned on, CPU 13 immediately confirms whether write speed data to be described later in more detail has been recorded on recording media 20 (step S1). If no write speed data is present such as, for example, when recording media 20 are initially used or immediately after recording media 20 are initialized (NO in step S1), CPU 13 starts to write a speed measurement file, for example prepared beforehand in program memory 19, to recording media 20 and to measure a time to be taken for this writing (step S2). When the writing of the speed measurement file is terminated (YES in step S3), CPU 13 terminates the measurement of the writing time, deletes the speed measurement file from recording media 20 (step S4), calculates a data write speed based on a size of the speed measurement file (for example, of 1 MB) and the measured writing time, and then records data on the calculated speed as such to recording media 20 (step S5). When the determination in step S1 is YES and the write speed data is already present on recording media 20, CPU 13 then reads out the recorded write speed data (step S6).

Subsequently, CPU 13 determines the write speed performance of set recording media 20 based on a write speed indicated by any item of the write speed data as follows. CPU 13 determines that if the write speed is 10 MB/sec or more, the write speed performance of set media 20 is high; if the write speed is 2 MB/sec or more and lower than 10 MB/sec, the write speed performance is medium; and if the write speed is lower than 2 MB/sec, the write speed performance is low (step S7). Then, CPU 13 starts to pick up an image of an object and display a through image on LCD 12 (step S8). Then, CPU 13 waits for the start of moving-image pickup by the shutter key (step S9). When the shutter key is operated to start the moving-image pickup (YES in step S9) and the write speed performance of the recording media 20 determined in step S7 is low, CPU 13 performs a recording operation in a buffer-data lump recording mode (according to a third method of the present invention) (step S1). If the write speed performance is medium, CPU 13 performs a recording operation in a ring-buffer recording mode (according to a second method of the present invention) (step S12). If the write speed performance is high, CPU 13 performs a recording operation in a stream recording mode (according to a first method of the present invention) (step S13).

Figure 4:
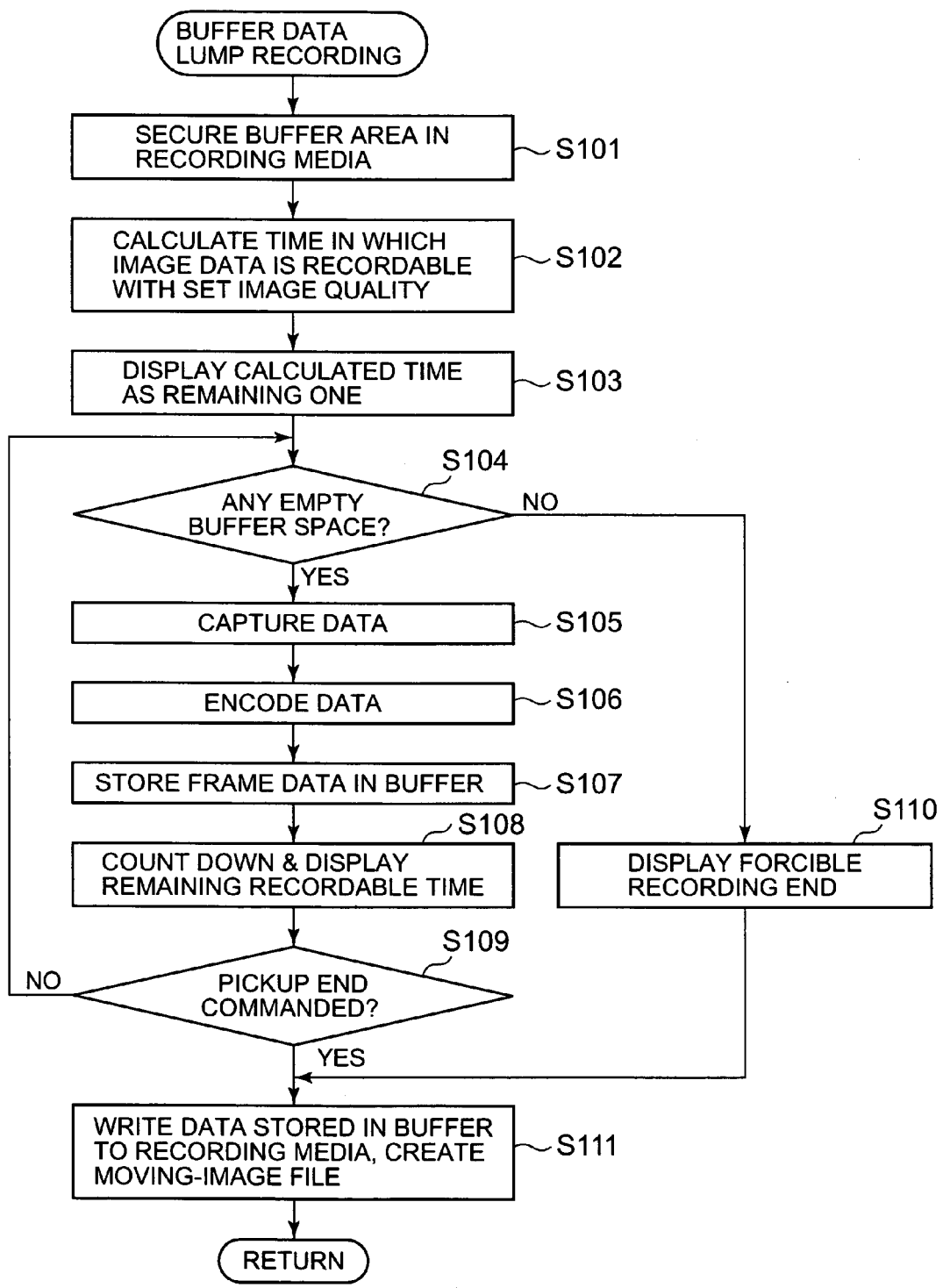
FIG. 4 is a flowchart of a subroutine of the FIG. 3 flowchart.

The recording operation in the buffer data lamp recording mode to be performed when the write speed performance of the recording media 20 is low will be described with reference to a flowchart of FIG. 4. In the following description, recording media 20 should have a memory capacity enough to record a long-time moving image. In the buffer-data lump recording mode, CPU 13 secures a predetermined buffer area 14c in memory 14 (step S101) and then calculates a time in which the moving picture is recordable with the set recording quality and size (or buffer capacity) (step S102). That is, CPU 13 calculates a presumed recordable time, using a prescribed size predetermined as an image data size for one frame in accordance with the recording quality. Then, the calculated time is displayed in an overlapping manner as a remaining recording time on a through image displayed on LCD 12 (step S103).

When buffer area 14c has an empty storage space in which moving-image data is recordable (YES in step S104), CPU 13 captures object image data at a frame rate (for example, of 30 fps) set in accordance with the recording quality at this time (step S105), encodes the data at a set compression rate (step S106), and then writes resulting frame moving-image data into buffer area 14c (step S107). Then, CPU 13 counts down the remaining recording time 102 displayed in step S103, thereby updating the displayed content (step S108).

Then, until the user terminates the image pickup operation with the shutter key, CPU 13 repeats the processing in steps S104-S107 (NO in step S109) and sequentially stores the respective frame moving image data in buffer area 14c. When buffer area 14c loses an empty storage space in the meantime (NO in step S104), CPU 13, displays a message "Recording will be forcibly terminated because the memory has no more empty storage space" (step S110). When the image pickup is terminated immediately after the display of such message or in accordance with the user's instructions (Yes in step S109), CPU 13 writes in a lump the moving image data for the frames stored in buffer area 14c to recording media 20 and then performs a predetermined process depending on the moving-image recording method, for example, including addition of header information to the whole moving-image data, thereby producing a final moving-image file (step S111). Then, CPU 13 returns to the processing of FIG. 3, thereby completing one moving-image pickup process.

Figure 5:
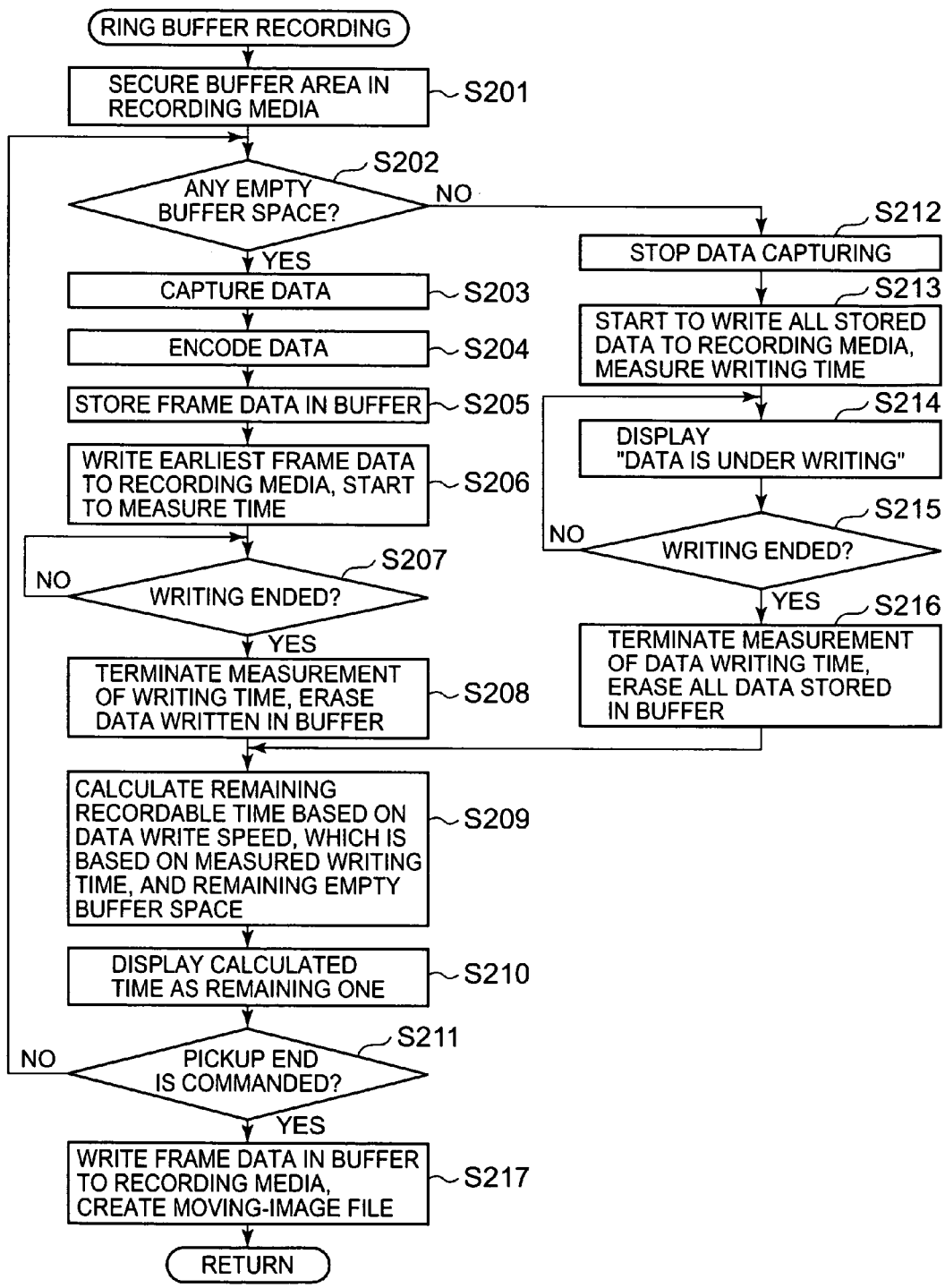
FIG. 5 is a flowchart of another subroutine of the FIG. 3 flowchart.

Then the recording operation in the ring buffer recording mode to be performed when the write speed performance of recording media 20 is medium will be described with reference to a flowchart of FIG. 5. In the ring buffer recording mode, CPU 13 first secures a predetermined buffer area 14c in memory 14 as in the buffer-data lump recording mode (step S201). When buffer area 14c has an empty storage space in which the moving-image data is recordable (YES in step S202), CPU 13 captures object image data at a frame rate (for example, of 30 fps) set in accordance with the recording quality at this time (step S203), encodes the data at a compression rate set (step S204), and then stores resulting moving-image frame data in buffer area 14c (step S205).

CPU 13 starts to write the earliest moving-image data stored in buffer area 14c to recoding media 20 and measure the writing time (step S206). When writing the earliest frame data is terminated (YES in step S207), CPU 13 terminates the measurement of the writing time and then erases the written moving-image data from buffer area 14c (step S208), at which time CPU 13 again calculates the write speed based on the measured actual time taken for writing the moving-image data, and then calculates a remaining recordable time based on the calculated write speed and the measure of the empty storage space remaining in buffer area 14c (step S209). Then, CPU 13 displays a calculated remaining recordable time in an overlapping manner on a through image displayed on LCD 12 (step S210). CPU 13 actually performs the processing in steps S206-S210 in parallel with the processing in steps S203-S205 Then, until the user terminates the image pickup operation with the shutter key, CPU 13 repeats the processing in step S202-S210 (NO in step S211). That is, CPU 13 sequentially records the moving-image data on recording media 20 while using buffer area 14c as a ring buffer.

Meanwhile, buffer area 14c has no more empty storage space in which moving-image data is writable (NO in step S202), CPU 13 temporarily stops capturing image-data (step S212), at which time CPU 13 starts to write all the moving-image data stored in buffer area 14c to recording media 20, to measure a time taken for writing the date (step S213), and then displays a message such as "data is under writing" on LCD 12 (step S214).

When CPU 13 terminates writing all the moving-image data to recording media 20 (Yes in step S215), CPU 13 also terminates the measurement of the writing time and then erases the written moving-image data from buffer area 14c (step S216). Then, CPU 13 goes to step S209, thereby again calculating the write speed based on the measured time taken for writing the actual moving-image data, calculates a recordable time based on the calculated write speed and the empty storage space remaining in buffer area 14c, and then displays the calculated recordable time (step S210). Then, unless the user terminates the image pickup operation (NO in step S211), CPU 13 resumes capturing the object image data temporarily stopped and then repeats the processing in steps S202-S210.

Then, when the user terminates the image pickup operation (YES in step S211), CPU 13 writes in a lump all the moving-image data for the plurality of frames stored or remaining in buffer area 14c on recording media 20 and then creates a final moving-image file by performing a predetermined process in accordance with the moving-image recording method including adding header information to the entire moving-image data (step S217). Then, CPU 13 returns to the processing of FIG. 3, thereby completing one moving-image pickup process.

The recording operation in the stream recording mode to be performed when the write speed performance of recording media 20 is high will be described with reference to a flowchart of FIG. 6. In the stream recording mode, CPU 13 immediately starts to count the recording time (step S301) and then captures object image data at a frame rate (for example, of 30 fps) set in accordance with the recording quality at this time (step S302). Then, CPU 13 encodes the image data at a set compression rate (step S303) and writes resulting encoded data directly to recording media 20 (step S304). In addition, CPU 13 displays an elapsed recording time in an overlapping manner on a through image displayed on LCD 12 (step S305).

Thereafter, until the user terminates the image pickup operation with the shutter key, CPU 13 repeats the processing in steps S302-S305 (NO in step S306), thereby sequentially recording moving-image data for the respective frames on recording media 20. Then, when the user terminates the image pickup operation (YES in step S306), CPU 13 creates a final moving-image file by performing the predetermined process in accordance with the moving-image recording method including adding header information to the whole moving-image data for the plurality of frames recorded on recording media 20 (step S307). Then, CPU 13 returns to FIG. 3 processing, thereby completing one moving-image pickup process.

As described above, in the present embodiment a moving image is recorded in the buffer data lump recording mode if the write speed performance of recording media 20 is low; the moving-image is recorded in the ring buffer recording mode if the write speed performance is medium; and the moving image is recorded in the stream recording mode if the write speed performance is high. Thus, the write speed performance of the recording media used will be brought into full play. The upper limit of the recording quality settable in consideration of variations in the write speed performance of recording media 20 to be used need not be set to a value indicative of a lower quality in consideration of use of recording media having low write speed performance, but can be set to that of recording media 20 having high write speed performance. As the write speed performance of the recording media 20 increases, the moving-picture recordable time increases.

While in the present embodiment the data write speed of recording media 20 starts to be measured or acquired when the power source is turned on in the recording mode, the write speed may start to be measured or acquired either when the power source is turned on irrespective of the mode set at this time or when the moving-image mode is set in a state in which the power source is on. Especially, if the data write speed starts to be measured or acquired either when the power source is turned on in the recording mode or when the moving-image mode is set in the recording mode in a state in which the power source is on, the time required for displaying the recorded image or for starting up the camera for image pickup purposes is reduced. The data write speed may be measured or acquired as required, or when the user performs a predetermined operation, without measuring or acquiring the data write speed automatically. In this case, the moving-image recording method to be performed in the moving-image pickup before the data write speed is measured or acquired need be selected beforehand from among the above-mentioned methods or need be selectable by the user.

When buffer area 14c had no more empty storage space in which new moving-image data was storable in the recording operation in the ring buffer recording mode in which the write speed performance of recording media 20 was medium (FIG. 5), all the data stored in buffer area 14c was illustrated as automatically written out to recording media 20, thereby continuing the moving-image pickup. Alternatively, when the arrangement may be such that buffer area 14c has no more empty storage space in which new moving-image data is storable, a message inquiring whether to continue the image pickup is displayed and only when the user indicates his or her intention to continue the image pickup, for example with the shutter key, the image pickup continues. In this case, when the user has picked up the moving image such that no frame images are missing during the image pickup, image pickup reflecting the user's intention is possible. Alternatively, while a through image is displayed after all the data stored in buffer area 14c have been automatically written to recording media 20, it may be arranged that the user can determine whether to continue the image pickup furthermore. In this case, there may be a case in which the compositional arrangement of a moving image to be picked up is not yet fixed when all the stored data have been written because the user again has the camera at the ready during the writing of the stored data. However, recording useless moving data in this case is prevented, advantageously.

While the remaining recording time 102 has been displayed in the recording operation in the buffer data lump recording mode when the write speed performance of recording media 20 is low (FIG. 4) and in the recording operation in the ring buffer recording mode when the write speed performance of recording media 20 is medium (FIG. 5), and an elapsed recording time 103 has been displayed in the stream recording mode when the write speed performance of recording media 20 is high, these displays may be disused. While in the ring buffer recording mode the write speed of the moving image data to recording media 20 has been illustrated as measured during the image pickup and the remaining recording time 102 has been calculated using the measured write speed, the remaining recording time 102 may be calculated using the data write speed measured or acquired initially in the processing of FIG. 3. Note that use of the write speed measured during the image pickup as in this embodiment ensures that the user can know an accurate remaining recording time.

While in the present embodiment the data write speed measured by writing the speed measurement file to recording media 20 when the power source is turned on in the recording mode is illustrated as written also as write speed data to recording media 20 so as to be usable in a next moving-image pickup operation, the arrangement may be such that the write speed performance determined based on the measured data write speed may be written as the write speed data to recording media 20 and determination of the write speed performance may be omitted in the subsequent moving-image pickup operations or when the power source is turned on in the recording mode.

While in the above description the digital camera to which the present invention is applied has been illustrated, the present invention may be applicable to other electronic cameras such as cellular phones with a camera and PDAs with a camera.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An electronic camera apparatus with a moving-image pickup function that records a moving image on a removable recording medium, the apparatus comprising:
   a speed performance determining unit for determining a data write speed performance of the recording medium;
   a writing unit for writing moving-image data on the recording medium in one of a plurality of moving-image recording methods determined in correspondence to the data write speed performance of the recording medium determined by the speed performance determining unit;

a buffer memory that temporarily and sequentially stores image data at a predetermined frame period for a plurality of frames, wherein the image data has been subjected to image processing for recording purposes, and wherein the moving-image recording methods include an indirect method of writing image data, which are stored temporarily in the buffer memory, in order of storage to the recording medium, and erasing the image data in the buffer memory that have been written to the recording medium;

an empty storage space detector for detecting a measure of a remaining empty storage space of the buffer memory while the writing unit writes the moving-image data to the recording medium in accordance with the indirect method of writing image data; and a record control unit, responsive to the empty storage space detector detecting that the remaining empty storage space of the buffer memory is less than a predetermined measure, for temporarily stopping the temporary storage of the image data to the buffer memory at the frame period, and then responsive to all the image data in the buffer memory being erased, for resuming the temporary storage of the image data to the buffer memory at the frame period.

2. The camera apparatus of claim 1, wherein the moving-image recording methods include a direct method of directly writing to the recording medium image data that has been subjected to image processing for recording purposes.

3. The electronic camera apparatus of claim 1, further comprising:

a speed measuring unit for measuring a speed of writing the image data from the buffer memory to the recording medium;

a calculation unit for calculating a time taken for storing the image data to the buffer memory from a completely empty storage state to a predetermined percentage capacity based on the data write speed measured by the speed measuring unit and a recording quality of the moving image recorded on the recording medium; and a display unit for displaying the time calculated by the calculating unit.

4. The camera apparatus of claim 1, further comprising:

a data write speed acquiring unit for acquiring data on a data write speed on the recording medium by writing the moving image data on the recording medium; and wherein the speed performance determining unit determines the data write speed performance of the recording medium based on the data write speed acquired by the data write speed acquiring unit.

5. The camera apparatus of claim 1, wherein the speed performance determining unit reads out information specifying the data write speed performance of the recording medium from the recording medium and then determines the data write speed performance of the recording medium based on the read information.

6. An electronic camera apparatus with a moving-image pickup function that records a moving image on a removable recording medium, the apparatus comprising:

a speed performance determining unit for determining a data write speed performance of the recording medium;

a writing unit for writing moving-image data on the recording medium in one of a plurality of moving-image recording methods determined in correspondence to the data write speed performance of the recording medium determined by the speed performance determining unit;

a buffer memory for temporarily storing image data, which has been subjected to image processing for recording purposes, for a plurality of frames to be recorded on the recording medium, wherein the moving-image recording methods include a lump method of writing to the recording medium in a lump the image data stored in the buffer memory during the image pickup when the image pickup is terminated;

a calculation unit for calculating a time in which the moving-image is recordable on recording medium, based on a measure of a remaining empty storage space of the buffer memory and a quality of the moving image to be recorded on the recording medium; and a display unit for displaying the time calculated by the calculation unit.

7. A moving image recording method, for use in an electronic camera apparatus with a moving-image pickup function, to record a moving image on a removable recording medium, the method comprising:

determining a data write speed performance of the recording medium;

writing the moving-image data on the recording medium in one of a plurality of moving-image recording methods determined in correspondence to the determined write speed performance of the recording medium;

temporarily and sequentially storing image data in a buffer memory at a predetermined frame period for a plurality of frames, wherein the image data has been subjected to image processing for recording purposes, and wherein the moving-image recording methods include an indirect method of writing image data, which are stored temporarily in the buffer memory, in order of storage to the recording medium, and erasing the image data in the buffer memory that have been written to the recording medium;

detecting a measure of a remaining empty storage space of the buffer memory while writing the moving-image data to the recording medium in accordance with the indirect method of writing the image data; and responsive to detecting that the remaining empty storage space of the buffer memory is less than a predetermined measure, temporarily stopping the temporary storage of the image data to the buffer memory at the frame period, and then responseive to all the image data in the buffer memory being erased, resuming the temporary storage of the image data to the buffer memory at the frame period.

8. A computer-readable recording medium having a computer program stored thereon for controlling an electronic camera apparatus with a moving-image pickup function to record a moving image on a removable recording medium, the program being configured to control the electronic camera apparatus to perform functions comprising: determining a data write speed performance of the recording medium;

writing the moving-image data on the recording medium in one of a plurality of moving-image recording methods determined in correspondence to the determined write speed performance of the recording medium;

temporarily and sequentially storing image data in a buffer memory at a predetermined frame period for a plurality of frames, wherein the image data has been subjected to image processing for recording purposes, and wherein the moving-image recording methods include an indirect method of writing image data, which are stored temporarily in the buffer memory, in order of storage to the recording medium, and erasing the image data in the buffer memory that have been written to the recording medium;

detecting a measure of a remaining empty storage space of the buffer memory while writing the moving-image data to the recording medium in accordance with the indirect method of writing the image data; and responsive to detecting that the remaining empty storage space of the buffer memory is less than a predetermined measure, temporarily stopping the temporary storage of the image data to the buffer memory at the frame period, and then responseive to all the image data in the buffer memory being erased, resuming the temporary storage of the image data to the buffer memory at the frame period.

* * * * *